United States Patent
Nippa et al.

(10) Patent No.: US 6,382,538 B1
(45) Date of Patent: May 7, 2002

(54) METHOD FOR MANUFACTURING ALUMINUM HYDROXIDE POWDER

(75) Inventors: Satoru Nippa; Toshiyuki Mizoe; Hisakatsu Kato, all of Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/576,953

(22) Filed: May 24, 2000

(30) Foreign Application Priority Data

Mar. 8, 2000 (JP) ............................................ 12-063459

(51) Int. Cl.$^7$ ................................................ B02C 19/12
(52) U.S. Cl. ......................................................... 241/30
(58) Field of Search ...................................... 241/21, 30

(56) References Cited

U.S. PATENT DOCUMENTS 5,587,010 A * 12/1996 Skibasaki et al.
6,019,498 A * 2/2000 Hamada et al.

FOREIGN PATENT DOCUMENTS

| JP | 3-122014 | * | 5/1991 |
| JP | 07-155597 | | 6/1995 |

* cited by examiner

*Primary Examiner*—Mark Rosenbaum
(74) *Attorney, Agent, or Firm*—Sughrue Mion, PLLC

(57) ABSTRACT

The present invention provides a method for manufacturing aluminum hydroxide powder highly fillable in a resin as a filler, comprising the step of grinding raw aluminum hydroxide using a kneader mixer.

4 Claims, No Drawings

METHOD FOR MANUFACTURING ALUMINUM HYDROXIDE POWDER

BACKGROUND OF THE INVENTION

1. Field of the Invention

The present invention relates to a method for manufacturing aluminum hydroxide powder. More particularly, it relates to a method for manufacturing aluminum hydroxide powder highly fillable in a resin as a filler.

2. Description of the Related Art

The aluminum hydroxide powder has been widely used as a filler for a resin molded article, and it is in increasing demand especially in the field of a resin molded article having a flame-resistant property.

The aluminum hydroxide powder used as a filler is generally manufacture by grinding raw aluminum hydroxide obtained from hydrolysis of a sodium aluminate solution using a vibrating mill.

In general, it is desirable to fill the aluminum hydroxide powder in large amounts in a resin in order to enhance the flame-resistant property of the resin molded article. However, when the aluminum hydroxide powder manufactured by this method is filled in large amounts in the resin, molding thereof is hindered, accordingly making it difficult to highly fill the powder therein.

SUMMARY OF THE INVENTION

It is an object of the present invention to provide a method for manufacturing aluminum hydroxide powder which improves the fillability in a resin and can be highly filled in a resin.

The present inventors have intensively studied on a method for manufacturing aluminum hydroxide powder which can be highly filled in a resin. As a result, they have found that aluminum hydroxide powder manufactured by grinding raw aluminum hydroxide using a kneader mixer is highly fillable in a resin.

That is, the present invention provides a method for manufacturing aluminum hydroxide powder comprising the step of grinding raw aluminum hydroxide using a kneader mixer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The raw aluminum hydroxide to be used in the present invention has a composition formula of $Al_2O_3 \cdot 3H_2O$, whose crystal structure is, for example, of a gibbsite type, a bayerite type, or the like, and preferably of the gibbsite type. In general, this raw aluminum hydroxide can be manufactured by the following method. That is, a seed crystal is added to a sodium aluminate solution in a supersaturated state, and sodium aluminate in the solution is hydrolyzed with stirring the solution to precipitate aluminum hydroxide. The resulting aluminum hydroxide is filtered and washed, followed by drying. Alternatively, commercially available aluminum hydroxide may also be used so long as it has the aforementioned composition formula and crystal structure.

This raw aluminum hydroxide is preferably powder. A mean particle size of a secondary particles (below, referred to as a mean secondary particle size) thereof is about 1 μm to about 150 μm, and preferably about 5 μm to about 70 μm. A mean particle size of a primary particles (below, referred to as a mean primary particle size) is about ⅛ to about ½ of the mean secondary particle size, and preferably about ⅙ to about ⅔ of the mean secondary particle size. The mean secondary particle size can be determined by a laser scattering diffraction method, while the mean primary particle size can be determined by a microscopic method.

In the present invention, the raw aluminum hydroxide is ground using a kneader mixer. The kneader mixer is sometimes referred to as a kneader, and it is an apparatus generally used for a purpose of mixing powder with a resin. In the present invention, the aluminum hydroxide powder highly fillable in the resin can be manufactured by adopting the kneader mixer for grinding the raw aluminum hydroxide.

In the kneader mixer, the raw aluminum hydroxide exists as a solid phase, and in addition to this, generally, air and the like exist as a vapor phase, and water and the like exist as a liquid phase (no water may sometimes exist as the liquid phase). The states thereof in the kneader mixer during grinding may exert an influence upon the physical properties of the aluminum hydroxide powder obtained by grinding. Therefore, the grinding is preferably carried out in the condition where the solid phase, liquid phase, and vapor phase exist in the following state: (a) a Dry state where the solid phase and the vapor phase exist continuously, and no liquid phase substantially exists, (b) a Pendular state where the solid phase and the vapor phase exist continuously, and the liquid phase exist discontinuously, or (c) a Funicular I state where the solid phase, the vapor phase, and the liquid phase exist continuously. Such a state forms a dry powdery mixed system outwardly.

As the kneader mixer, there may be mentioned apparatuses capable of kneading the raw aluminum hydroxide with application of a shear force under compression. Examples thereof include a co-kneader, a kneader mixer having a heating means or a cooling means, a self-cleaning-type kneader mixer, a gear compounder, a single screw-type kneader mixer, and a double screw-type kneader mixer. The kneader mixer may be used alone, or may be used in combination of two or more thereof. Further, although the kneader mixer of either batch type or continuous type can be adopted, the continuous type is preferred from the viewpoint of decreasing the grinding energy per unit weight. When the kneader mixer of the continuous type is used, the raw aluminum hydroxide mixer is not necessarily required to be wholly ground in a part of the kneader mixer. It is sufficient that the degree of grinding increases successively along the direction of transportation (axial direction) of the raw aluminum hydroxide.

The raw aluminum hydroxide is ground under maximum compression pressure in the kneader mixer of about 5 kgf/cm² (0.49 MPa) or more, preferably about 10 kgf/cm² (1.0 MPa) or more, and about 500 kgf/cm² (49.0 MPa) or less, preferably about 200 kgf/cm² (19.6 MPa) or less.

In the case of the screw-type kneader mixer, the compression pressure can be adjusted by, for example, the shape, length, and number of revolutions of the screw, the number of revolutions of a rotor (having a function of transporting the raw to the screw), and the like.

Usually, the raw aluminum hydroxide comprises secondary particles composed of primary particles with a small particle size aggregated. By performing grinding the raw aluminum hydroxide under compression pressure in the aforementioned range using the kneader mixer, the primary particles are efficiently freed from its aggregated structure without substantially breaking the primary particles. Therefore, the grinding energy expended for grinding the primary particles can be saved. Consequently, there is a possibility that the aluminum hydroxide powder highly fillable in a resin can be obtained with less grinding energy.

Grinding thereof is preferably carried out after adjusting the liquid content of the raw aluminum hydroxide prior to the grinding so as to achieve the Dry state, the Pendular state, or the Funicular I state during grinding. Adjustment of the liquid content may be at accomplished by, for example, drying the raw aluminum hydroxide, or adding a liquid such as water, alcohol, or a surface treatment agent shown below thereto.

The preferred liquid content varies depending upon the mean secondary particle size and particle size distribution, and the like of the raw aluminum hydroxide, and is not be uniquely defined. However, it is 30% by weight or less, preferably 20% by weight or less, further preferably 10% by weight or less, and also it is 0% by weight or more, preferably 1% by weight or more, further preferably 5% by weight or more. Too high liquid content makes it difficult to grind the raw aluminum hydroxide efficiently.

Alternatively, grinding may also be carried out in the presence of a surface treatment agent. Examples of the surface treatment agent include various coupling agents such as a silane coupling agent, a titanate coupling agent, and an aluminate coupling agent, fatty acids such as oleic acid and stearic acid and fatty acid esters thereof, phosphoric ester, alkylphosphoric ester, and silicates such as methyl silicate and ethyl silicate.

When a liquid such as water is added during grinding, or the raw aluminum hydroxide containing water or the like is ground, the aluminum hydroxide powder after grinding is generally subjected to drying. Drying thereof can be accomplished, for example, by a method using a known drying machine, alternatively, when grinding is carried out by a continuous kneader mixer, by a method in which the kneader mixer is partially heated, or the like.

The aluminum hydroxide powder thus obtained generally has a BET specific surface area of about 1.2 $m^2/g$ to about 4 $m^2/g$, and thus tends to show a higher BET surface specific area as compared with the aluminum hydroxide powder with the same mean secondary particle size obtained by grinding using an oscillating mill. When this aluminum hydroxide powder is filled in a resin to form a molded article, there is a possibility that the contact area of the resin and the aluminum hydroxide powder can be increased, accordingly the strength of the molded article can be increased as compared with the case where the aluminum hydroxide powder obtained by grinding using the oscillating mill.

The aluminum hydroxide powder obtained according to the present invention is highly fillable in a resin, and hence it is preferable as a filler for a resin molded article having a flame-resistant property, an artificial marble, or the like. Examples of an applicable resin include thermosetting resins such as unsaturated polyester resin, epoxy resin, phenol resin, and polyurethane resin; polyolefins typically including polyethylene, polypropylene, copolymer of ethylene and propylene, copolymers of ethylene and/or propylene, and other α-olefins such as butene-1, pentene-1, hexene-1, heptene-1, octene-1, nonene-1, 4-methylpentene-1, and decene-1, and thermoplastic resins such as styrene (co) polymer, methyl methacrylate (co)polymer, polyamide, polycarbonate, ethylene-vinyl acetate copolymer, polyacetal, acrylonitrile-butadiene-styrene copolymer, polyphenylene oxide, polyether salfone, polyarylate, polyether ether ketone, and polymethylpentene. Of course, the use of this aluminum hydroxide powder is not restricted to the these resins, and the powder can be used as a filler for other synthetic resins, natural resins, paper, or the like.

EXAMPLES

The present invention will be further illustrated in detail with the following examples, but the invention is not limited to the examples.

The aluminum hydroxide powder in each of the following examples was evaluated using the following method.

(1) Fillability:

The fillability of the aluminum hydroxide in a resin is evaluated by determining the amount of dioctyl phthalate absorbed in the aluminum hydroxide powder (below, referred to as DOP oil absorption).

DOP oil absorption (ml/100 g) was determined by the method in accordance with JIS-K6221.

The fillability of the aluminum hydroxide powder in a resin is improved with a decrease in DOP oil absorption of the aluminum hydroxide powder. Accordingly, the amount of the aluminum hydroxide powder filled in a resin can be increased with a decrease in DOP oil absorption.

It is disclosed in "Industrial Material (Kogyo Zairyo)", p.p. 116–117, vol. 39., No. 1, (1991), that the amount of a filler filled in a resin can be increased, i.e., the fillability in the resin is improved, with a decrease in oil absorption.

(2) Crystal Structure:

The crystal structure was determined by an X-ray diffraction method.

(3) Mean Secondary Particle Size ($\mu$m):

The mean secondary particle size ($\mu$m) was determined by a laser scattering particle size distribution meter [Microtrack HRA: manufactured by LEED & NORTHRUP].

(3) Mean Primary Particle Size ($\mu$m):

The mean primary particle size ($\mu$m) was determined by observation under a scanning electron microscope.

(4) BET Specific Surface Area ($m^2/g$):

The BET specific surface area ($m^2/g$) was determined by a nitrogen adsorption method.

Example 1

A seed crystal was added to a sodium aluminate solution in a supersaturated state, and sodium aluminate in the solution was hydrolyzed with stirring the solution to precipitate coarse aluminum hydroxide. Thereafter, the coarse aluminum hydroxide was filtered and washed, followed by dehydration to obtain raw aluminum hydroxide (crystal structure: gibbsite type, mean secondary particle size: 68 $\mu$m, mean primary particle size: 12 $\mu$m, DOP oil absorption: 29.9 ml/100 g, and water content: 5%).

The raw aluminum hydroxide obtained was continuously charged in a single screw-type kneader mixer (MP-30-1 type: manufactured by Miyazaki Tekko K.K., screw length: 210 mm, screw diameter: 30 mm, screw speed: 49 rpm, and rotor speed: 10 rpm) to be ground. Then, the ground aluminum hydroxide obtained was continuously charged again in the single screw-type kneader mixer to be ground, followed by drying at 120° C. to obtain aluminum hydroxide powder. The physical properties of the aluminum hydroxide powder obtained was shown in Table 1.

Comparative Example 1

The same raw aluminum hydroxide as the one used in Example 1 was dried, so that the water content is 0%. Then, it was ground for 30 minutes in an oscillating mill (internal volume: 2L, charge of the raw aluminum hydroxide: 0.3 kg, charge of 8 m φ balls: 2.9 kg, and vibrational amplitude: 3 mm) to obtain aluminum hydroxide powder. The physical properties of the aluminum hydroxide powder obtained was shown in Table 1.

TABLE 1

|  | Mean secondary particle size (μm) | DOP oil absorption (ml/100 g) | BET specific surface area (m$^2$/g) |
|---|---|---|---|
| Example 1 | 17 | 21.5 | 1.4 |
| Comparative example 1 | 16 | 30.0 | 1.0 |

Example 2

Commercially available aluminum hydroxide (trade name: H-100ME, available from Showa Denko K.K., crystal structure: gibbsite type, mean secondary particle size: 67 μm, mean primary particle size: 22 μm, DOP oil absorption: 27.8 ml/100 g, and water content: 5%) was continuously charged in a single screw-type kneader mixer (MP-30-1 type, manufactured by Miyazaki Tekko K.K., screw length: 210 mm, screw diameter: 30 mm, screw speed: 49 rpm, and rotor speed: 10 rpm) to be ground. Then, the ground aluminum hydroxide obtained was continuously charged in the single screw-type kneader mixer to be ground two times repeatedly, followed by drying at 120 ° C. to obtain aluminum hydroxide powder. The physical properties of the aluminum hydroxide powder obtained is shown in Table 2.

Comparative Example 2

The same raw aluminum hydroxide as the one used in Example 2 was ground for 15 minutes in an oscillating mill (internal volume: 2L, charge of the raw aluminum hydroxide: 0.3 kg, charge of 8 m φ balls: 2.9 kg, and vibrational amplitude: 3 mm) to obtain aluminum hydroxide powder. The physical properties of the aluminum hydroxide powder obtained was shown in Table 2.

Comparative Example 3

An experiment was performed in the same manner as in Comparative Example 2, except that the grinding time in the oscillating mill was changed into 30 minutes. The physical properties of the aluminum hydroxide powder obtained was shown in Table 2.

TABLE 2

|  | Mean secondary particle size (μm) | DOP oil absorption (ml/100 g) | BET specific surface area (m$^2$/g) |
|---|---|---|---|
| Example 2 | 37 | 23.1 | 2.4 |
| Comparative example 2 | 46 | 26.1 | 0.5 |
| Comparative example 3 | 29 | 28.4 | 0.9 |

Example 3

Aluminum hydroxide powder was obtained in the same manner as in Example 2, except that commercially available aluminum hydroxide (trade name: B-30, available from Alcoa Kasei K.K., crystal structure: gibbsite type, mean secondary particle size: 61 μm, mean primary particle size: 20 μm, DOP oil absorption: 34.2 ml/100 g, and water content: 2%) is used. The physical properties of the aluminum hydroxide powder obtained was shown in Table 3.

Comparative Example 4

The same raw aluminum hydroxide as the one used in Example 3 was dried, so that the water content was 0%, and then ground for 15 minutes in an oscillating mill (internal volume: 2L, charge of the raw aluminum hydroxide: 0.3 kg, charge of 8 m φ balls: 2.9 kg, and vibrational amplitude: 3 mm) to obtain aluminum hydroxide powder. The physical properties of the aluminum hydroxide powder obtained was shown in Table 3.

Comparative Example 5

An experiment was performed in the same manner as in Comparative Example 4, except that the grinding time in the oscillating mill was changed into 30 minutes. The physical properties of the aluminum hydroxide powder obtained was shown in Table 3.

TABLE 3

|  | Mean secondary particle size (μm) | DOP oil absorption (ml/100 g) | BET specific surface area (m$^2$/g) |
|---|---|---|---|
| Example 3 | 29 | 25.1 | 2.2 |
| Comparative example 4 | 38 | 27.1 | 0.5 |
| Comparative example 5 | 19 | 29.0 | 0.9 |

Example 4

A seed crystal was added to a sodium aluminate solution in a supersaturated state, and sodium aluminate in the solution was hydrolyzed with stirring the solution to precipitate coarse aluminum hydroxide. Thereafter, the coarse aluminum hydroxide was filtered and washed, followed by dehydration to obtain raw aluminum hydroxide (crystal structure: gibbsite type, mean secondary particle size: 81 μm, mean primary particle size: 16 μmm, DOP oil absorption: 37.9 ml/100 g, and water content: 5%).

The raw aluminum hydroxide obtained was continuously charged in a single screw type kneader mixer (MP-100 type: manufactured by Miyazaki Tekko K.K., screw length: 615 mm, screw diameter: 100 mm, screw speed: 20 rpm, and rotor speed: 16 rpm) to be ground. Then, the ground aluminum hydroxide obtained was continuously charged in the single screw type kneader mixer to be ground two times repeatedly, followed by drying at 120 ° C. to obtain aluminum hydroxide powder.

The maximum compression pressure measured at the time of the second grinding was 10.2 kgf/cm$^2$ (1.00 MPa).

The physical properties of the aluminum hydroxide powder obtained was shown in Table 4.

TABLE 4

|  | Mean secondary particle size (μm) | DOP oil absorption (ml/100 g) | BET specific surface area (m$^2$/g) |
|---|---|---|---|
| Example 4 | 49.5 | 25.2 | 1.0 |

According to the method of the present invention, there can be easily manufactured the aluminum hydroxide powder with a low DOP oil absorption, and highly fillable in a resin.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A method for manufacturing aluminum hydroxide powder comprising the step of grinding raw aluminum hydroxide using a kneader mixer, wherein a liquid content of the raw aluminum hydroxide is about 30% by weight or less and a maximum compression pressure in the kneader mixer is about 0.49 MPa to about 49.0 MPa.

2. The method according to claim 1, wherein the raw aluminum hydroxide has a crystal structure of a gibbsite type.

3. The method according to any of claim 1, wherein the raw aluminum hydroxide has a mean secondary particle size of about 1 μm to about 150 μm.

4. The method according to claim 1, wherein the ratio of a mean primary particle size to the mean secondary particle size of the raw aluminum hydroxide is about ⅛ to about ½.

* * * * *